(12) United States Patent
Meador

(10) Patent No.: US 8,268,216 B2
(45) Date of Patent: Sep. 18, 2012

(54) PROCESS OF FORMING A COMPRESSION-MOLDED CLOSURE LINER

(75) Inventor: Joshua S. Meador, Bowling Green, KY (US)

(73) Assignee: Berry Plastics Corporation, Evansville, IN (US)

( * ) Notice: Subject to any disclaimer, the term of this patent is extended or adjusted under 35 U.S.C. 154(b) by 164 days.

(21) Appl. No.: 12/542,569

(22) Filed: Aug. 17, 2009

(65) Prior Publication Data

US 2010/0052210 A1    Mar. 4, 2010

Related U.S. Application Data

(60) Provisional application No. 61/093,662, filed on Sep. 2, 2008.

(51) Int. Cl.
*B29C 43/18* (2006.01)

(52) U.S. Cl. .................. 264/268; 264/328.12; 425/127; 425/809

(58) Field of Classification Search .................. None
See application file for complete search history.

(56) References Cited

U.S. PATENT DOCUMENTS

| | | |
|---|---|---|
| 3,360,148 A | 12/1967 | Owen |
| 3,547,746 A | 12/1970 | Gwinner |
| 4,436,216 A | 3/1984 | Chang |
| 4,489,844 A | 12/1984 | Breskin |
| 4,547,746 A | 10/1985 | Erickson et al. |
| 4,552,279 A | 11/1985 | Mueller et al. |
| 4,744,478 A | 5/1988 | Hahn |
| 4,866,100 A | 9/1989 | Johnson et al. |
| 4,872,573 A | 10/1989 | Johnson et al. |
| 4,879,138 A | 11/1989 | Johnson et al. |
| 5,332,381 A | 7/1994 | Shapcott |
| 5,839,592 A * | 11/1998 | Hayes ........................... 215/230 |
| 5,947,311 A | 9/1999 | Gregory |
| 6,103,170 A | 8/2000 | Gregory |
| 6,581,793 B1 | 6/2003 | Racine et al. |
| 6,696,123 B2 | 2/2004 | Hock et al. |
| 7,021,478 B1 | 4/2006 | Hock |
| 7,314,589 B2 | 1/2008 | Parrinello |
| 2008/0087627 A1* | 4/2008 | Zuffa et al. ................... 215/341 |

FOREIGN PATENT DOCUMENTS

FR        1092529         4/1955
WO    WO 2006/040661     * 4/2006

* cited by examiner

*Primary Examiner* — Edmund H. Lee
(74) *Attorney, Agent, or Firm* — Barnes & Thornburg LLP

(57) ABSTRACT

A container closer includes a cap and a seal liner coupled to the cap. The cap is configured to mount on a filler neck of a container to mate the seal liner with a brim of the filler neck.

23 Claims, 7 Drawing Sheets

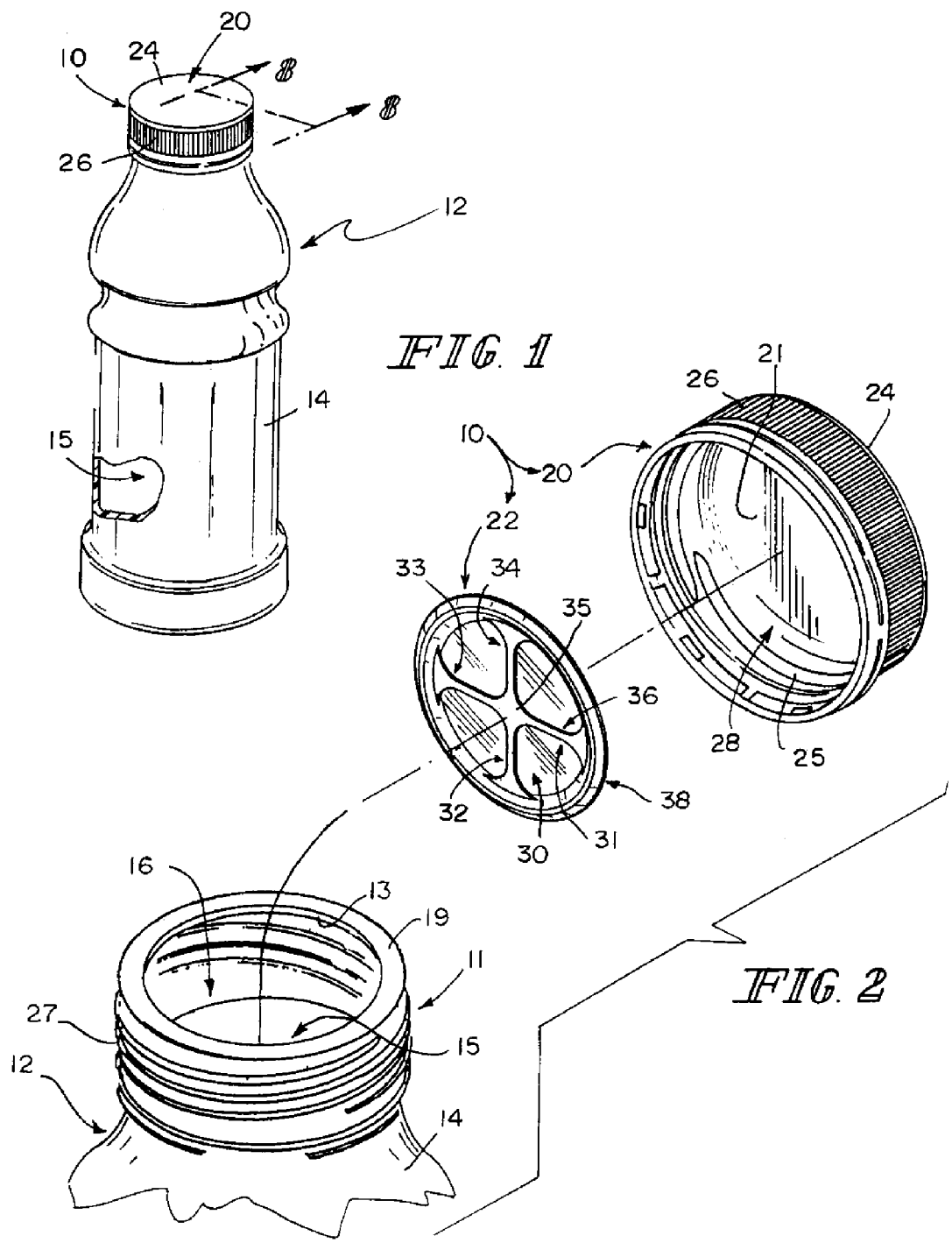

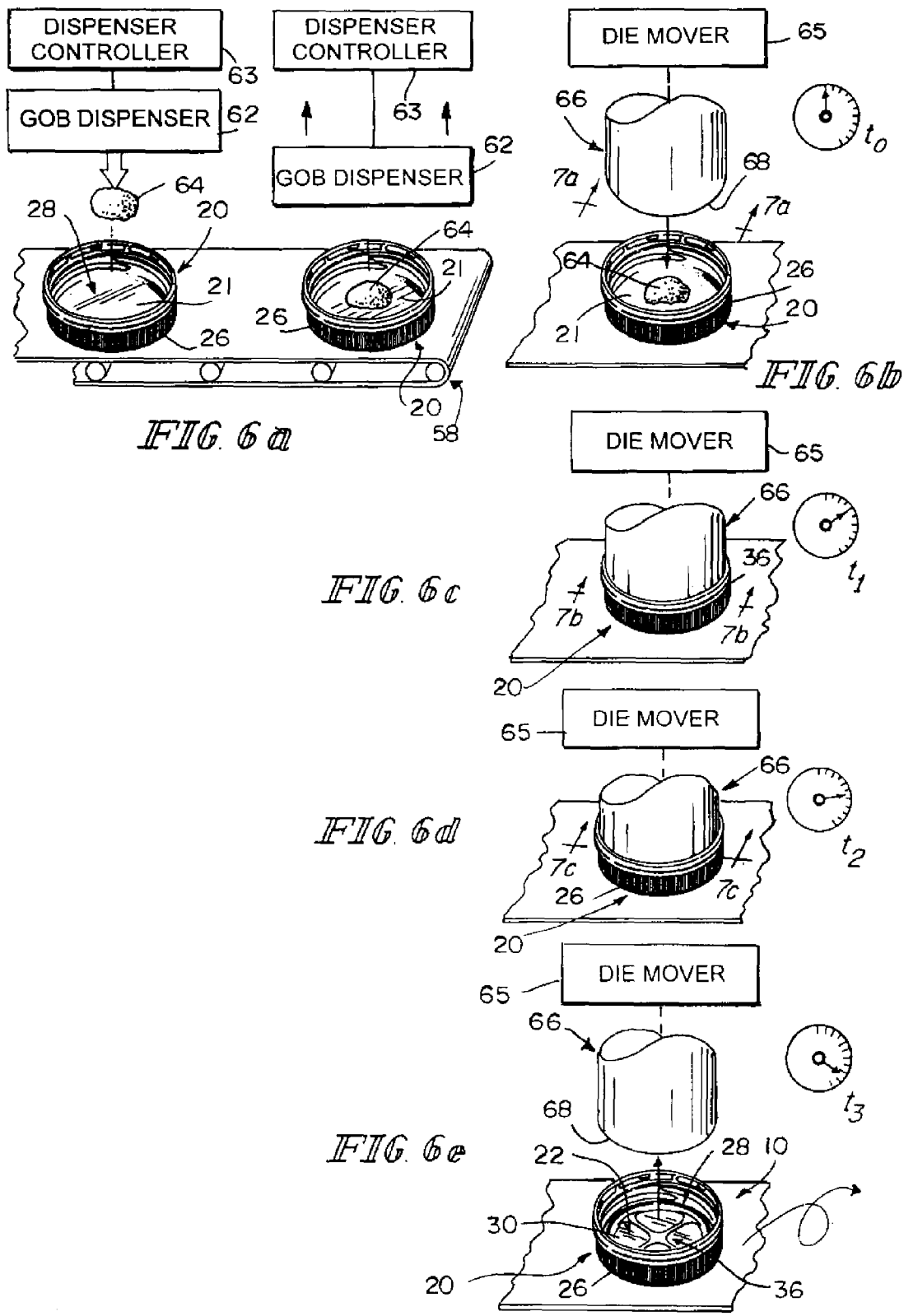

PROCESS OF FORMING A COMPRESSION-MOLDED CLOSURE LINER

This application claims priority under 35 U.S.C. §119(e) to U.S. Provisional Application Ser. No. 61/093,662, filed Sep. 2, 2008, which is expressly incorporated by reference herein.

BACKGROUND

The present disclosure relates to containers, and particularly to closures for containers. More particularly, the present disclosure relates to a closure liner that is used to seal a mouth opening into a product-receiving chamber formed in the container.

SUMMARY

According to the present disclosure, a closure comprises a cap having a top wall and an annular side wall extending from the top wall. The closure includes a seal liner that is adapted to seal a mouth opening into a product-receiving chamber formed in a container. The seal liner blocks the contents of the product-receiving chamber from leaking from the mouth opening of the container when the closure is coupled to the container.

In illustrative embodiments, the seal liner is compression molded on an interior deck to lie in an interior region of the cap. The compression-molded seal liner includes a thin round membrane surrounded by an annular sealing rim. The annular sealing rim is arranged to engage the brim of the container to establish a sealed connection between the closure and the container to block leakage of the contents of the container through the mouth of the container. The seal liner also includes a cross-shaped raised ridge that is formed on the membrane during a compression-molding process.

In illustrative embodiments, the compression-molding process is accomplished using a liner-forming die having a mold face formed to include a centrally located basin and an annular seal rim-forming trench located near the outer edge of the mold face. The mold face is formed to include several channels that extend radially inwardly toward the center of the mold face from the annular seal rim-forming trench. The channels permit melted liner material to flow rapidly from the center of the mold face in radially outward directions to the annular seal rim-forming trench during molding to ensure that the annular seal rim-forming trench is filled completely with liner material during the compression molding process. In this way, the thin round membrane and the surrounding annular sealing rim of the seal liner are formed on an interior deck of a cap and in the interior region of the cap by the liner-forming die during an illustrative compression-molding process.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective view of a package, with portions broken away, showing a container and a closure mounted on the container to cover a mouth opening into a product-receiving chamber formed in the container, the closure including a round top wall and an annular side wall depending from the round top wall;

FIG. 2 is an enlarged exploded view of portions of the package shown in FIG. 1 showing that the closure includes a cap configured to mate with a filler neck included in the container and a compression-molded liner configured in accordance with a first embodiment of the present disclosure and sized to fit into an interior region formed in the cap and showing that the liner includes a thin round membrane, an annular sealing rim appended to a perimeter edge of the membrane and sized to mate with an annular rim included in the filler neck of the container, and a cross-shaped raised ridge coupled to an underside of the membrane and to a circular inner edge of the annular sealing rim formed on the membrane during a compression-molding process shown, for example, in FIGS. 6a-6c;

FIGS. 6a-6e are a series of diagrammatic views illustrating an exemplary compression-molding process for forming the liner of FIGS. 2-4 on an interior deck and in an interior region of an inverted cap while the cap moves along a suitable conveyor;

FIG. 6a shows a gob of liner material being deposited onto an interior deck moved into the interior region of a companion first cap to locate the gob in the interior region of the first cap by a gob dispenser that is controlled by a dispenser controller and another gob of plastics material at rest on the interior deck and in the interior region of a companion second cap located in downstream relation on the conveyor to the first cap;

FIG. 6b shows the second cap of FIG. 6a after it has been moved further in a downstream direction along the conveyor to assume a new position under a liner-forming die configured in accordance with the present disclosure and controlled by a die mover at time to during a compression-molding process;

FIG. 6c shows the liner-forming die after it has been moved a first distance into the interior region of the second cap at a later time $t_1$ during the compression-molding process to begin to compress the gob of plastics material between the liner-forming die and the interior deck of the cap as suggested in FIG. 7b;

FIG. 6d shows the liner-forming die at a later time $t_2$ during the compression-molding process after it has been moved further into the interior region of the second cap to compress the gob of plastics material further as suggested in FIG. 7c;

FIG. 6e shows the liner-forming die at a later time $t_3$ during the compression-molding process after it has been withdrawn from the interior region of the second cap leaving a compression-molded liner of the type shown in FIGS. 2-5 in place on the interior deck of the second cap;

FIG. 9 is a plan view of an underside of a liner in accordance with a second embodiment of the present disclosure showing four T-shaped ridge legs coupled to a thin round membrane and coupled to an annular sealing rim at twelve o'clock, three o'clock, six o'clock, and nine o'clock positions on the annular sealing rim;

FIG. 10 is a plan view of an underside of a liner in accordance with a third embodiment of the present disclosure showing three T-shaped ridge legs coupled to a thin round membrane and coupled to an annular seating rim at twelve o'clock, four o'clock, and eight o'clock positions on the annular sealing rim;

FIG. 11 is a plan view of an underside of a liner in accordance with a fourth embodiment of the present disclosure showing two T-shaped ridge legs coupled to a thin round membrane, each ridge leg segment being coupled at an outer end to an annular sealing rim and at an inner end to a round protuberance coupled to the membrane and formed in the basin of the mold face; and FIG. 12 is a plan view of an underside of a liner in accordance with a fifth embodiment of the present disclosure that is similar to the liner of FIG. 11 but with narrower ridge legs.

DETAILED DESCRIPTION

Figure 7A:
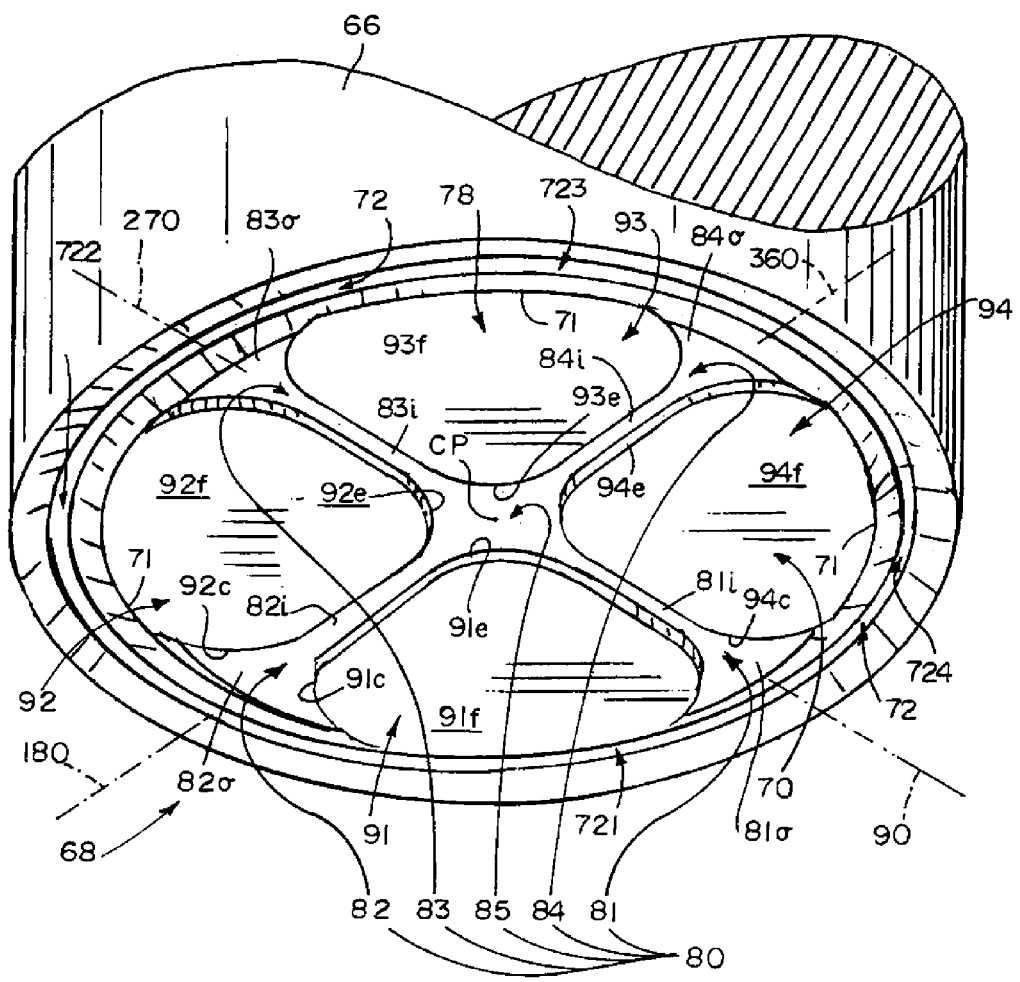
FIG. 7a is an enlarged perspective view of the liner-forming die shown in FIG. 6b at time $t_0$ during a compression-molding process and showing formation of a mold face of the liner-forming die to include a basin located in the center of the mold face of the liner-forming die and four ridge-leg channels extending in radially outward directions from the basin to an annular seal rim-forming trench located near a round perimeter edge of the mold face to provide means for conveying plastics material in the gob from the basin in radially outward directions toward the annular seal rim-forming trench to fill that annular seal rim-forming trench during the compression-molding process as suggested in FIGS. 7b and 7c.

Closure 10 includes a cap 20 and an illustrative compression-molded seal liner 22 formed in an interior region 28 of an inverted cap 20 as suggested in FIGS. 2 and 5a-5e by moving a liner-forming die 66 into interior region 28 of cap 20 to compress a gob 64 of plastics material at rest on an underside 21 of cap 20. Portions of gob 64 flow in radially outward directions as suggested in FIGS. 6a-6c through an illustrative cross-shaped gob conduit 80 formed on the underside of liner-forming die 66 as shown in FIG. 7a to fill a mold chamber defined in interior region 28 of cap 20 between the moving liner-forming die 66 and the relatively stationary inverted cap 20.

One illustrative compression-molded seal liner 22 formed to include a cross-shaped fill-runner pattern is suggested in FIGS. 2-6. Other illustrative seal liners provided with other fill-runner pattern shapes for compression-molded seal liners 222, 322, 422, 522 are shown in FIGS. 9-12.

Figure 8:
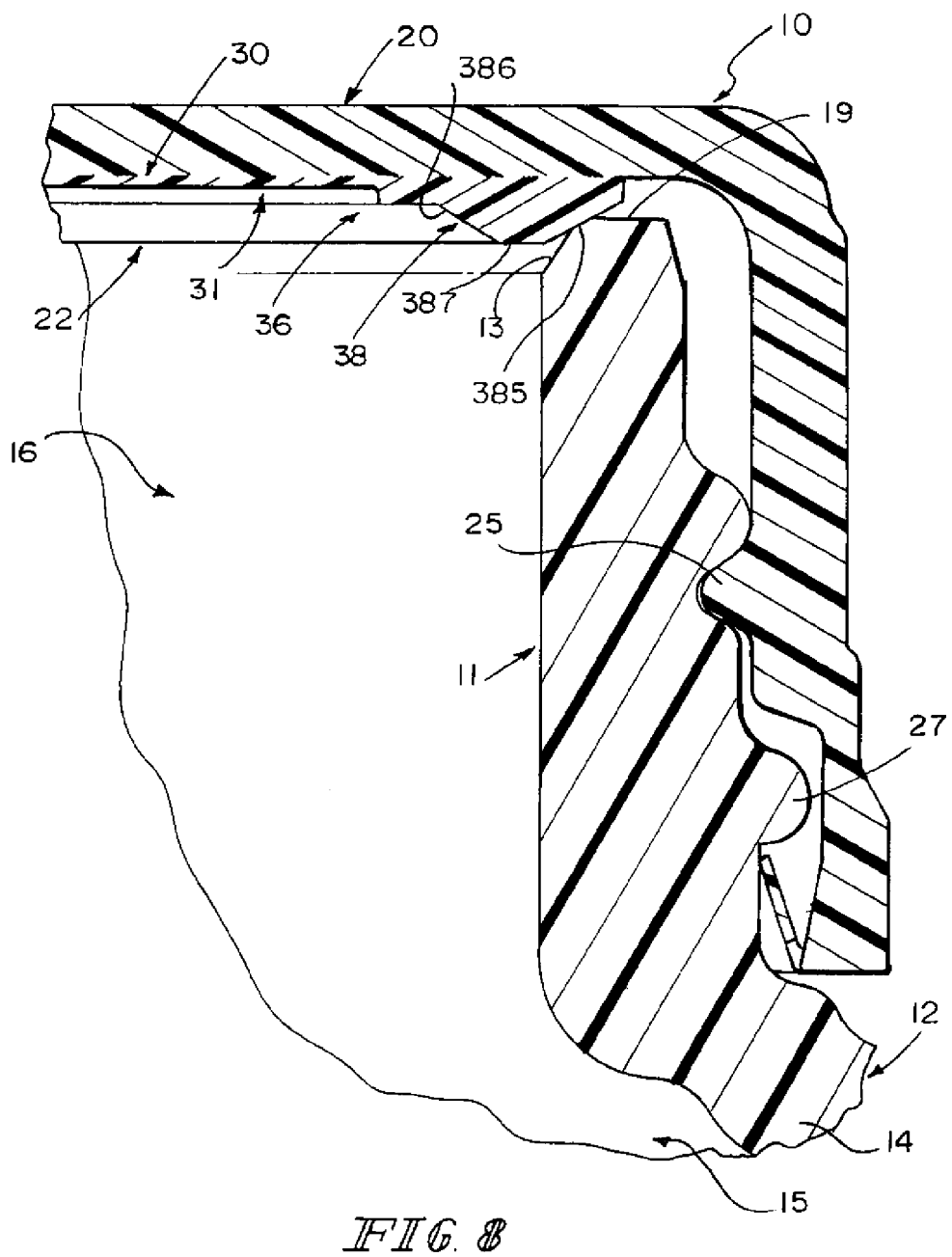
FIG. 8 is an enlarged sectional view taken along line 8-8 of FIG. 1 showing the closure mounted on the container and showing that the annular sealing rim of the compression-molded liner included in the closure is mated with a circular rim included in the filler neck of the container to establish a sealed connection between the closure and the container to block leakage of the contents from the container.

Closure 10 is configured to mount on a filler neck 11 of a container 12 to close an open mouth 13 formed in filler neck 11 as suggested in FIGS. 1 and 2 and 8. Container 12 also includes a body 14 coupled to filler neck 11 and formed to include an interior region 15 as shown, for example, in FIG. 1. Mouth 13 opens into a passageway 16 formed in filler neck 11 and is arranged to communicate with interior region 15 formed in body 14.

Seal liner 22 is configured to mate with an outer brim 19 included in filler neck 11 to establish a sealed connection between closure 10 and container 12 as suggested in FIGS. 1, 2, and 8. Such a sealed connection functions to block leakage of any liquids or other fluid materials stored in interior region 15 and passageway 16 of container 12 from container 12 while closure 10 is mounted on filler neck 11 of container 12.

Cap 20 includes a round top wall 24 and an annular side wall 26 that extends downwardly from a perimeter edge of round top wall 24 as suggested in FIGS. 1, 2, and 8. Round top wall 24 includes a downwardly facing interior deck 21 providing an underside of cap 20 and mating with compression-molded liner 22. Fastener means 25 (e.g., internal threads) is provided on an interior surface of annular side wall 26 of cap 20 for mating with external threads 27 or other features provided on filler neck 11 to retain closure 10 in a sealed position on filler neck 11 as suggested in FIGS. 1, 2, and 8. It is within the scope of the present disclosure to use any suitable means to retain closure 10 on filler neck 11.

Seal liner 22 includes a round membrane 30 and an annular sealing rim 38 as shown, for example, in FIG. 2. Annular sealing rim 38 surrounds membrane 30 and mates with a perimeter edge 37 of membrane 30 as shown, for example, in FIGS. 2-5. Annular sealing rim 38 includes a tapered outer wall 385, a tapered inner wall 386, and a top wall 387 positioned between the tapered outer and inner walls 385, 386 as shown, for example, in FIG. 8. While annular sealing rim 38 is shown with tapered side walls, a square or rounded or other suitable seal profile could also be used to create a seal between compression-molded seal liner 22 and outer brim 19 of container 12.

A cross-shaped raised ridge 36 is included in seal liner 22 as suggested in FIGS. 2-5 and formed in the cross-shaped gob conduit 80 as suggested in FIGS. 6 and 7. Raised ridge 36 is coupled to the underside of membrane 30 and surrounded by annular sealing rim 38 as shown, for example, in FIGS. 4 and 5. Cross-shaped raised ridge 36 includes a central leg connector 35 located in the center of membrane 30 and four ridge legs 31, 32, 33, and 34 arranged to extend in radially outward directions from central leg connector 35 to annular sealing rim 38 as shown, for example, in FIGS. 2 and 5.

Figure 5:
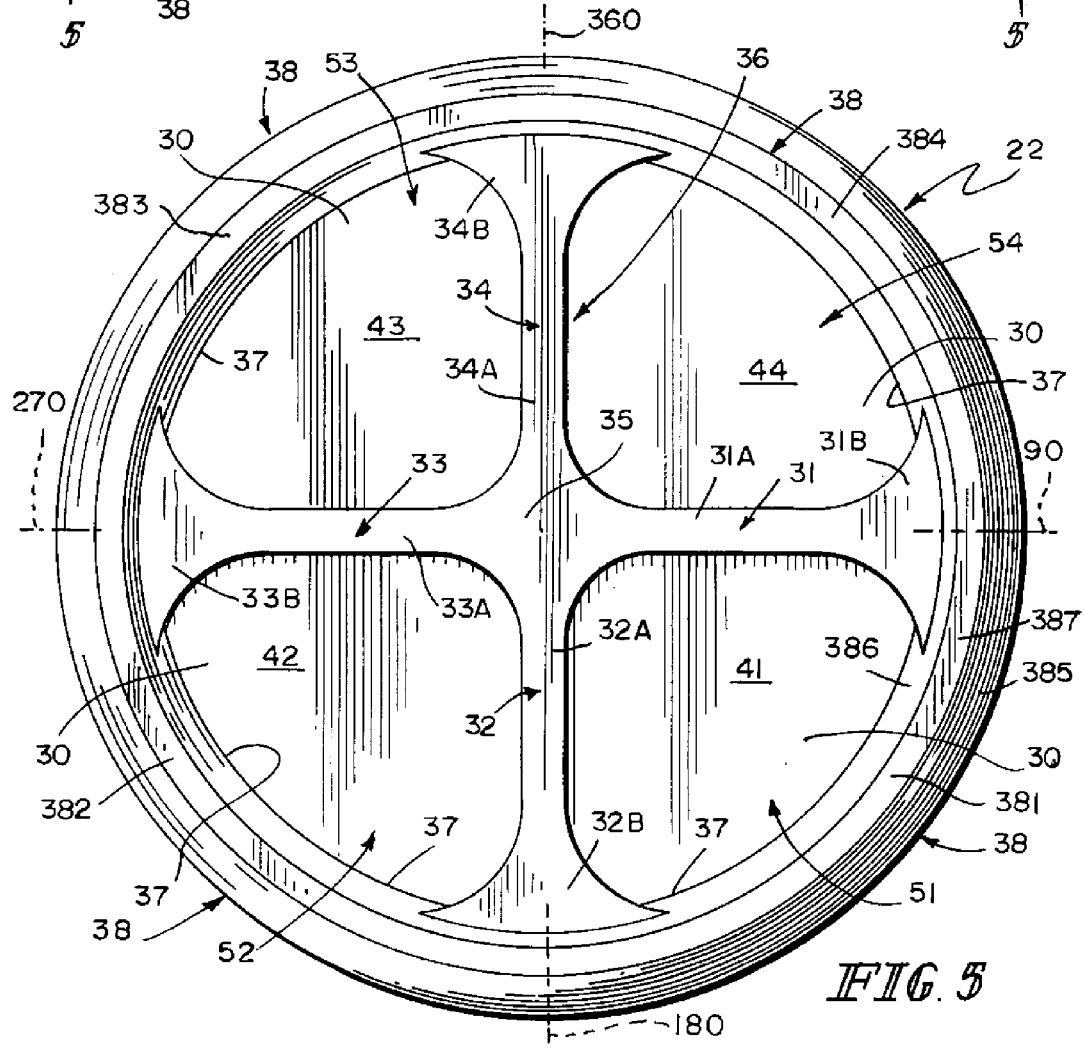
FIG. 5 is an enlarged bottom plan view of the compression-molded liner of FIGS. 2-4 showing the annular sealing rim surrounding the round membrane and the cross-shaped raised ridge mating with the round membrane and touching (in four places) the circular inner edge of the annular sealing rim.

In an illustrative embodiment shown best in FIG. 5, first ridge leg 31 extends away from central leg connector 35 along reference line 90 at a bearing of about ninety degrees and second ridge leg 32 extends away from central leg connector 35 along reference line 180 at a bearing of about one hundred eighty degrees. Third ridge leg 33 extends away from central leg connector 35 along reference line 270 at a bearing of about two hundred seventy degrees. Fourth ridge leg 34 extends away from central leg connector 35 along reference line 360 at a bearing of about three hundred sixty degrees. Accordingly, each pair of adjacent ridge legs included in raised ridge 36 cooperate to form an included angle of about ninety degrees therebetween.

As suggested in FIG. 5, the underside of membrane 30 in seal liner 22 includes a first cavity floor 41, a second cavity floor 42, a third cavity floor 43, and a fourth cavity floor 44. First and second ridge legs 31, 32 cooperate with first cavity floor 41 and a first arcuate section 381 of annular sealing rim 38 to form a shallow first-quadrant cavity 51 in compression-molded seal liner 22 as suggested in FIG. 5. Second and third ridge leg 32, 33 cooperate with second cavity floor 42 and a second arcuate section 382 of annular sealing rim 38 to form a shallow second-quadrant cavity 52 in seal liner 22. Third and fourth ridge legs 33, 34 cooperate with third cavity floor 43 and a third arcuate section 383 of annular sealing rim 38 to form a shallow third-quadrant cavity 53 in seal liner 22. Fourth and first ridge legs 34, 31 cooperate with fourth cavity floor 44 and a fourth arcuate section 384 of annular sealing rim 38 to form a shallow fourth-quadrant cavity 54 in seal liner 22. Each of cavity floors 41, 42, 43, 44 is relatively thin so to conserve plastics material during formation of cap 20.

As also shown, for example, in FIG. 5, in an illustrative embodiment each of ridge legs 31, 32, 33, 34 is horn-shaped and includes a lead pipe coupled at one end to leg connector 35 and a bell coupled to an opposite end of leg connector 35 and to annular sealing rim 38. Each of the bells is bell-shaped and widens progressively in a direction extending from the companion lead pipe to annular sealing rim 38 as suggested in FIG. 5. First ridge leg 31 includes lead pipe 31A and bell 31B as shown, for example, in FIG. 5. Second ridge leg 32 includes lead pipe 32A and bell 32B. Third ridge leg 33 includes lead pipe 33A and bell 33B. Fourth ridge leg 34 includes lead pipe 34A and bell 34B.

An illustrative compression-molding process of forming closure 10 is shown in FIGS. 6a-6c and 7a-7c. The process comprising the steps of providing a cap 20 formed to include an interior region 28 and depositing a gob 64 of plastics material onto an interior deck 21 of cap 20 to locate gob 64 in interior region 20 of cap 20 as suggested in FIG. 6a. As suggested diagrammatically in FIG. 6a, gob 64 is dispensed using a gob dispenser 62 controlled by a dispenser controller 63. As suggested in FIGS. 6a-6e, the illustrative process further comprises the step of moving a liner-forming die 66 into interior region 28 of cap 20 using a die mover 65 to cause a downwardly facing one-piece mold face 68 included in liner-forming die 66 to engage and compress gob 64 of plastics material at rest on interior deck 21 of cap 20. Such compression causes plastics material in gob 64 to flow in a mold chamber 40 defined between one-piece mold face 68 of liner-forming die 66 and interior deck 21 of cap 20 in a manner suggested in FIGS. 7b and 7c to form a compression-molded seal liner 22 on interior deck 21 of cap 20 in interior region 28 of cap 20. Mold chamber 40 has a constant volume when one-piece mold face 68 engages interior deck 21 of cap 20 as suggested in FIG. 6d.

One-piece mold face 68 is formed to include a membrane-forming surface 70 and an annular sealing rim-forming trench 72 surrounding membrane-forming surface 70 as shown, for example, in FIG. 7a. One-piece mold face 68 is also formed to include channel means 80 arranged to interrupt membrane-forming surface 70 for receiving a portion of the plastics material in gob 64 and conducting the portion in radially outward directions toward annular sealing rim-forming trench 72 of one-piece mold face 68 and a perimeter edge of interior deck 21 of cap 20 during movement of one-piece mold face 68 toward interior deck 21 as suggested in FIGS. 7b and 7c to cause membrane-forming surface 70 to be covered completely with plastics material and to cause plastics material to flow into and fill completely annular sealing rim-forming trench 72 to form annular sealing rim 38 of seal liner 22 therein. Channel means 80 provides a gob conduit to transfer portions of gob 64 from a center point CP of one-piece mold face 68 to annular sealing rim-forming trench 72 so as to manage flow of plastics material in gob 64 to provide a seal liner 22 having a satisfactory membrane 30 and annular sealing rim 38.

Channel means 80 includes a first ridge-leg channel 81 communicating at an outlet end thereof with annular seal rim-forming trench 72 and providing a first fill path for plastics material extending along reference line 90 and toward annular seal rim-forming trench 72 as suggested in FIG. 7a. Plastics material from gob 64 that solidifies in first ridge-leg channel 81 forms first ridge leg 31 of cross-shaped ridge 36 in seal liner 22.

Channel means 80 further includes a second ridge-leg channel 82 communicating at an outlet end thereof with annular seal rim-forming trench 72 and providing a second fill path for plastics material extending along reference line 180 and toward annular seal rim-forming trench 72 as suggested in FIG. 7a. Plastics material from gob 64 that solidifies in second ridge-leg channel 82 forms second ridge leg 32 of cross-shaped raised ridge 36 in seal liner 22.

Channel means 80 further includes a third ridge-leg channel 83 communicating at an outlet end thereof with annular seal rim-forming trench 72 and providing a third fill path for plastics material extending along reference line 270 and toward annular seal rim-forming trench 72 as suggested in FIG. 7a. Plastics material from gob 64 that solidifies in third ridge-leg channel 83 forms third ridge leg 33 of cross-shaped raised ridge 36 in seal liner 22.

Channel means further includes a fourth ridge-leg channel 84 communicating at an outlet end thereof with annular seal mm-forming trench 72 and providing a fourth fill path for plastics material extending along reference line 360 and toward annular seal rim-forming trench 72 as suggested in FIG. 7a. Plastics material from gob 64 that solidifies in fourth ridge-leg channel 84 forms fourth ridge leg 34 of cross-shaped raised ridge 36 in seal liner 22.

Each of first, second, third, and fourth ridge-leg channels 81, 82, 83, 84 is arranged to extend from annular seal rim-forming trench 72 in a radially inwardly extending direction toward a center point CP located in the center of membrane-forming surface 70 as suggested in FIG. 7a. Each of first, second, third, and fourth ridge-leg channels 81, 82, 83, 84 also includes an inlet end arranged to lie in spaced-apart relation to annular seal rim-forming trench 72.

Channel means 80 further includes a leg-connector basin 85 arranged to lie at a center point CP of one-piece mold face 68 in fluid communication with an inlet end of each of first, second, third, and fourth ridge-leg channels 81, 82, 83, 84 as shown, for example, in FIG. 7a. Leg-connector basin 85 is arranged to overlie gob 64 just prior to the commencement of the moving step as shown, for example, in FIG. 6b. Gob 64 of plastics material will fill leg-connector basin 85 during the moving step as suggested in FIGS. 6b, 6c, and 7b as die mover 65 causes liner-forming die 66 to move downwardly toward interior deck 21 of inverted cap 20.

Membrane-forming surface 70 of one-piece mold face 68 includes four raised pads 91, 92, 93, 94 as shown, for example, in FIG. 7a. First raised pad 91 is bounded by first and second ridge-leg channels 81, 82 and a first curved portion 721 of annular seal rim-forming trench 72. Second raised pad 92 is bounded by second and third ridge-leg channels 82, 83 and a second curved portion 722 of annular seal rim-forming trench 72. Third raised pad 93 is bounded by third and fourth ridge-leg channels 83, 84 and a third curved portion 723 of annular seal rim-forming trench 72. Fourth raised pad 94 is bounded by fourth and first ridge-leg channels 84, 81 and a fourth curved portion 724 of annular seal rim-forming trench 72. As an example, leg-connector basin 85 and ridge-leg channels 81, 82, 83, 84 lie in coplanar relation to one another to establish no more than four spaced-apart pads 91, 92, 93, 94 included in membrane 30 of compression-molded seal liner 22 as shown in FIG. 7a.

Each of the first, second, third, and fourth raised pads 91, 92, 93, 94 has a teardrop-shaped perimeter edge 91e, 92e, 93e, or 94e shown, for example, in FIG. 7a. Each of first, second, third, and fourth raised pads 91, 92, 93, 94 includes a flat surface 91f, 92f, 93f, or 94f arranged to engage plastics material in the gob 64 located outside of first, second, third, and fourth ridge-leg channels 81, 82, 83, 84 during movement of one-piece mold face 68 of liner-forming die 66 toward interior deck 21 of cap 20. Flat surfaces 91f, 92f, 93f, 94f are arranged to lie in substantially coplanar relation to one another as suggested in FIG. 7a. Each of the flat surfaces 91f, 92f, 93f, 94f has a teardrop-shaped perimeter edge as suggested in FIG. 7a.

First ridge-leg channel 81 includes inner and outer sections 81i, 81o. Inner section 81i is located between annular seal-rim forming trench 72 and a center point CP located in the center of membrane-forming surface 70 as suggested in FIG. 7a. Outer section 81o is arranged to lie between and in fluid communication with inner section 81i and annular seal rim-forming trench 72. Outer section 81i is bell-shaped and has a width that widens progressively in a direction extending from inner section 81i toward annular seal rim-forming trench 72. First raised pad 91 and second raised pad 92 are arranged to lie in spaced-apart relation to one another to locate inner and outer sections 81i, 81o of first ridge-leg channel 81 therebetween. Similarly, second ridge-leg channel 82 includes inner and outer sections 82i, 82o, third ridge-leg channel 83 includes inner and outer sections 83i, 83o, and fourth ridge-leg channel 84 includes inner and outer sections 84i, 84o.

First raised pad 91 includes a curved convex exterior perimeter edge 91c bordering one side of bell-shaped outer section 82o of second ridge-leg channel 82 and having a radius of curvature of about 0.3 inch in an illustrative embodiment. Second raised pad 92 includes a curved convex exterior perimeter edge 92c bordering an opposite side of bell-shaped outer section 82o of second ridge-leg channel 82 and having a radius of curvature of about 0.3 inch in an illustrative embodiment. Curved convex exterior perimeter edges 91c, 92c of first and second raised pads 91f, 92f cooperate to form therebetween flow-expansion means for expanding flow of plastics material flowing from inner section 82i into annular seal rim-forming trench 72 through bell-shaped outer section 82o to transfer plastics material in gob 64 into annular seal rim-forming trench 72 during the moving step. Similar flow-expansion means are formed between pairs of adjacent raised pads 92, 93; 93, 94; and 94, 91 and associated with each of outlet sections 83o, 84o, and 81o as suggested in FIG. 7a.

Inner section 81i of first ridge-leg channel 81 is defined between an exterior perimeter edge of first raised pad 91 and a confronting exterior perimeter edge of fourth raised pad 94 arranged to lie in substantially spaced-apart parallel relation to exterior perimeter edge of first raised pad 91. This configuration provides inner section 81i of first ridge-leg channel 91 with a substantially uniform width. Similarly, in an illustrative embodiment, each of inner sections 82i, 83i, 84i has a substantially uniform width.

Channel means 80 further includes a leg-connector basin 85 arranged to lie at center point CP of one-piece mold face 68 as suggested in FIG. 7a. Inner sections 81i, 82i, 83i, 84i are arranged to lie in fluid communication with basin 85. Gob 64 of plastics material moves into basin 85 during the moving step. Plastics material in gob 64 moves, for example, through inner and outer sections 81 i, 81o of first ridge-leg channel 81 along a first fill path extending along reference line 90 into annular seal rim-forming trench 72 during the moving step.

Movement of liner-forming die 66 into interior region 28 of cap 20 causes a one-piece mold face 68 included in liner-forming die 66 to engage and compress gob 64 of plastics material to cause plastics material to flow in a mold chamber defined between one-piece mold face 68 of liner-forming die 66 and interior deck 21 of cap 20 in a first direction at a bearing of about 90° along a first fill path extending along reference line 90 into annular seal rim-forming trench 72 formed in one-piece mold face 68. This establishes from gob 64 of plastics material (1) a first moving sheet 101 of plastics material moving in the mold chamber generally along first fill path 90 toward and into annular seal rim-forming trench 72 during the moving step as suggested in FIGS. 7b and 7c and (2) a second moving sheet 102 of plastics material moving in the mold chamber generally along the second fill path 180 toward and into annular seal rim-forming trench 72 during the moving step as also suggested in FIGS. 7b and 7c. Mold chamber 40 has a constant volume when one-piece mold face 68 engages interior deck 21 of cap 20 as suggested in FIG. 6d.

Figure 7B:
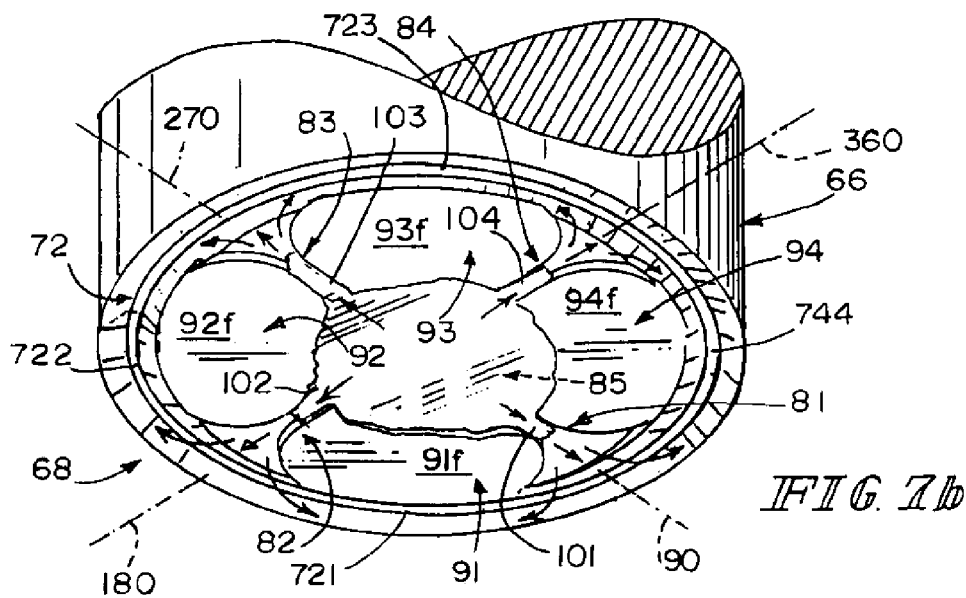
FIG. 7b is a view similar to FIG. 7a at a later time $t_1$ during the compression-molding process and showing flow of portions of the plastics material in the gob through the four radially outwardly extending ridge-leg channels.

Channel means 80 includes a first ridge-leg channel 81 extending at a bearing of about 90° and communicating at an outlet end 81o thereof with annular seal rim-forming trench 72 and a second ridge-leg channel 82 extending at a bearing of about 180° and communicating at an outlet end 82o thereof with annular seal rim-forming trench 72 as suggested in FIG. 7b. Membrane-forming surface 70 includes a first raised pad 91 located between the first and second ridge-leg channels 81, 82 and a first curved portion 721 of annular seal rim-forming trench 72. As suggested in FIG. 7c, first and second moving sheets 101, 102 of plastics material flow respectively along the first and second fill paths 90, 180 into first curved portion 721 of annular seal rim-forming trench and merge with one another therein before plastics material from at least one of first and second moving sheets 101, 102 completely covers first raised pad 91 during the moving step.

Plastics material from at least one of first and second moving sheets 101, 102 of plastics material completely covers first raised pad 91 during the moving step to form a first cavity floor 41 of membrane 30. Plastics material from gob 64 fills first ridge-leg channel 81 during the moving step to form a first ridge leg 31 therein on membrane 30 and fills second ridge-leg channel 82 during the moving step to form a second-ridge leg 32 therein on membrane 30. First and second ridge legs 31, 32 cooperate with first cavity floor 41 and a first arcuate section 381 of annular sealing rim 38 formed in first curved portion 721 of annular seal rim-forming trench 72 to form a shallow first-quadrant cavity 51 in compression-molded seal liner 22.

Movement of the liner-forming die 22 into interior region 28 of cap 20 during the moving step also causes plastics material to flow in the mold chamber in a third direction at a bearing of about 270° along a third fill path 270 into annular seal rim-forming trench 72. This establishes from gob 64 of plastics material a third moving sheet 103 of a plastics material moving in the mold chamber generally along third fill path 270 toward and into annular seal rim-forming trench 72 during the moving step as suggested in FIGS. 7b and 7c. Channel means 80 further includes a third ridge-leg channel 83 extending at a bearing of about 270° and communicating at an outlet end 83o thereof with annular seal rim-forming trench 72. Membrane-forming surface 70 further includes a second raised pad 92 located between second and third ridge-leg channels 82, 83 and a second curved portion 722 of annular seal rim-forming trench 72. Second and third moving sheets 102, 103 of plastics material flow respectively along the second and third fill paths 180, 270 into second curved portion 722 of annular seal rim-forming trench 72 and merge with one another therein before plastics material from at least one of the second and third moving sheets completely covers second raised pad 92 during the moving step as suggested in FIG. 7c.

Movement of the liner-forming die 66 into interior region 28 of cap 20 during the moving step also causes plastics material to flow in the mold chamber and in a fourth direction at a bearing of about 360° along a fourth fill path 360 into the annular seal rim-forming trench 72. This establishes from gob 64 of plastics material moving in the mold chamber a fourth moving sheet 104 of plastics material separate from the first, second, and third moving sheets 101, 102, 103 and moving in the mold chamber generally along the fourth fill path 360 toward and into annular seal rim-forming trench 72 during the moving step as suggested in FIGS. 7b and 7c. Channel means 80 further includes a fourth ridge-leg channel 84 extending at a bearing of about 360° and communicating at an outlet end 84o thereof with annular seal rim-forming trench 72. Membrane-forming surface 70 further includes a third raised pad 93 located between third and fourth ridge-leg channels 83, 84 and a third curved portion 723 of annular seal rim-forming trench 72. Third and fourth moving sheets 103, 104 of plastics material flow respectively along the third and fourth fill paths 270, 360 into third curved portion 723 of annular seal rim-forming trench 72 and merge with one another therein before plastics material from at least one of the third and fourth moving sheets 103, 104 completely covers third raised pad 93 during the moving step as suggested in FIG. 7c Membrane-forming surface 70 further includes a fourth raised pad 94 located between fourth and first ridge-leg channels 84, 81 and a fourth curved portion 724 of annular seal rim-forming trench 72. Fourth and first moving sheets 104, 101 of plastics material flow respectively along the fourth and first fill paths 360, 90 into the fourth curved portion of annular seal rim-forming trench 72 and merge with one another therein before plastics material from at least one of the fourth and first moving sheets 104, 101 completely covers fourth raised pad 94 during the moving step as suggested in FIG. 7c.

Plastics material from gob 64 during the moving step fills first ridge-leg channel 81 to form a first ridge leg 31 therein on membrane 30, second ridge-leg channel 82 to form a second ridge leg 32 therein on membrane 30, third ridge-leg channel 83 to form a third ridge leg 33 therein on membrane 30, and fourth ridge-leg channel 84 to form a fourth ridge leg 34 therein on membrane 30. Also during the moving step, plastics material from gob 64 on first raised pad 91 forms first cavity floor 41, second raised pad 92 forms second cavity floor 42, third raised pad 93 forms third cavity floor 43, and fourth raised pad 94 forms fourth cavity floor 44.

One-piece face 68 includes a center point CP and is formed to include an annular seal rim-forming trench 72 as shown, for example, in FIG. 7a. Trench 72 is arranged to surround center point CP of one-piece mold face 68 and is filled with plastics material in gob 64 to form the annular sealing rim 38 therein during the moving step. One-piece face 68 is also formed to include a ridge-leg channel associated with each raised ridge leg and filled with plastics material in gob 64 to form one of the raised ridge legs therein during the moving step. Each ridge-leg channel 31, 32, 33, 34 includes an inner section located between annular seal rim-forming trench 72 and center point CP of one-piece mold face 68 and an outer section arranged to lie between and in fluid communication with the companion inner section and annular seal rim-forming trench 72. Each outer section 81o, 82o, 83o, 84o is bell-shaped and has a width that widens progressively in a direction extending from the companion inner section toward annular seal rim-forming trench 72.

As suggested in FIGS. 1-8, one-piece mold face 68 is formed to include four ridge-leg channels 81, 82, 83, 84 and each pair of adjacent ridge-leg channels cooperates to form an included angle of about 90° therebetween. This arrangement of ridge-leg channels causes compression-molded seal liner 22 to have four ridge legs 31, 32, 33, 34 and to cause each pair of adjacent ridge legs to cooperate to form an included angle of about 90° therebetween.

Compression-molded liner 22 is compression molded into interior region 28 of cap 20 by use of the compression-molding process shown in FIGS. 6a-6e. To form compression-molded liner 22, cap 20 is set in an inverted positioned on a conveyor 58 with interior region 28 oriented in an upwardly facing direction, as shown in FIG. 6a. Dispenser controller 63 causes gob dispenser 62 to dispense a gob 64 of plastics material into interior region 28 of cap 20 and onto interior deck 21 of cap 20. Once gob 64 is positioned within interior region 28, cap 20 is conveyed beneath liner-forming die 66 of the type shown in FIGS. 6b-6e.

At time to cap 20 is positioned beneath liner-forming die 66 and gob 64 is positioned at the center of interior deck 21 of cap 20, as shown in FIG. 6b. During this stage, liner-forming die 66 is at rest and positioned above cap 20. Liner-forming die 66 is formed to include a recessed basin 85 located in the center of liner-forming die 66, as shown in FIG. 7a.

Figure 7C:
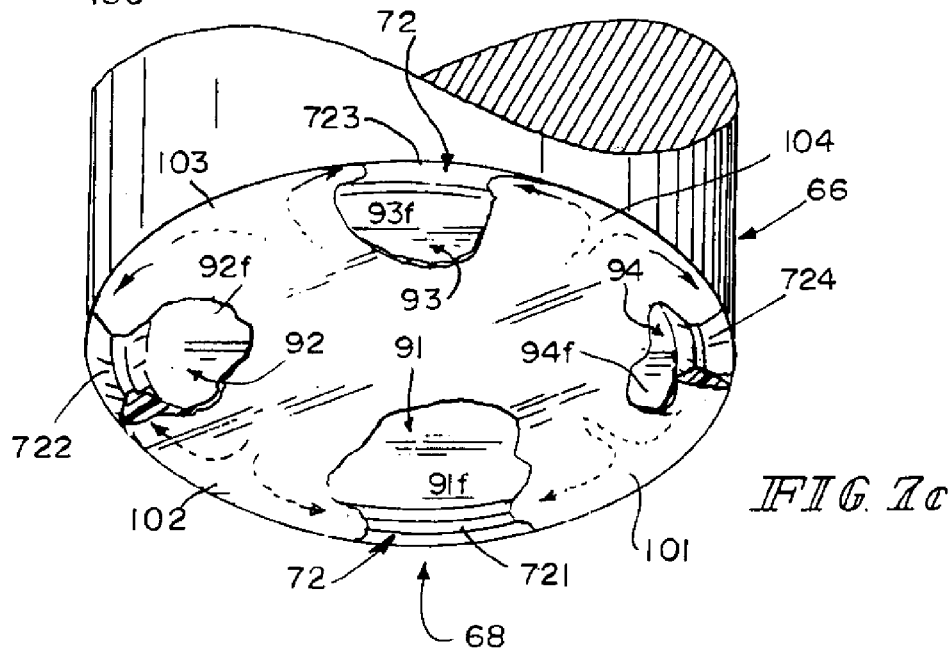
FIG. 7c is a view similar to FIGS. 7a and 7b at a later time $t_2$ during the compression-molding process showing portions of the plastics material in the gob that have been conveyed through the four radially outwardly extending ridge-leg channels and into the annular seal rim-forming trench.

Liner-forming die 66 also includes four channels 81, 82, 83, 84 and an annular seal rim-forming trench 72 located near a round perimeter edge of liner-forming die 66, as shown in FIG. 7l. Channels 81, 82, 83, 84 extend radially outwardly from basin 85 to annular seal rim-forming trench 72 to provide means for conveying liner material in the form of gob 64 from basin 85 toward annular seal rim-forming trench 72 to fill the trench 72 as shown in FIGS. 7b and 7c.

At time $t_1$ die mover 65 causes liner-forming die 66 to move downwardly to engage gob 64, as shown in FIG. 6c. Movement of liner-forming die 66 in a downwardly direction causes gob 64 to flow radially outwardly in channels 81, 82, 83, 84 toward annular seal rim-forming trench 72, as shown in FIGS. 7b and 7c. Channels 81, 82, 83, 84 allow gob 64 to flow quickly from basin 85 to annular seal rim-forming trench 72 to reduce the time needed to form compression-molded liner 22.

At time $t_2$ liner-forming die 66 causes gob 64 to continue to move radially outwardly toward annular seal rim-forming trench 72, as shown in FIG. 6d. Movement of liner-forming die 66 in a downwardly direction causes gob 64 to flow through channels 81, 82, 83, 84 and across plateaus established by raised pads 91, 92, 93, 94 to fill annular seal rim-forming trench 72, as shown in FIG. 7c. After liner-forming die 66 fully compresses gob 64, die mover 65 retracts liner-forming die 66 to reveal a finished closure 10 at time $t_3$, as shown in FIG. 6e.

Figure 3:
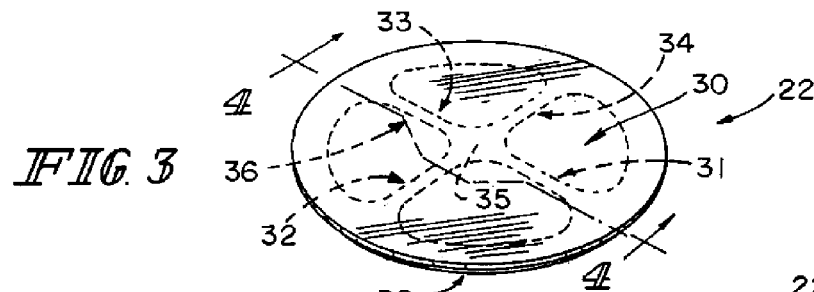
FIG. 3 is an enlarged perspective view of the compression-molded liner of FIG. 2 as it would appear if it were separated from the cap.
Figure 4:
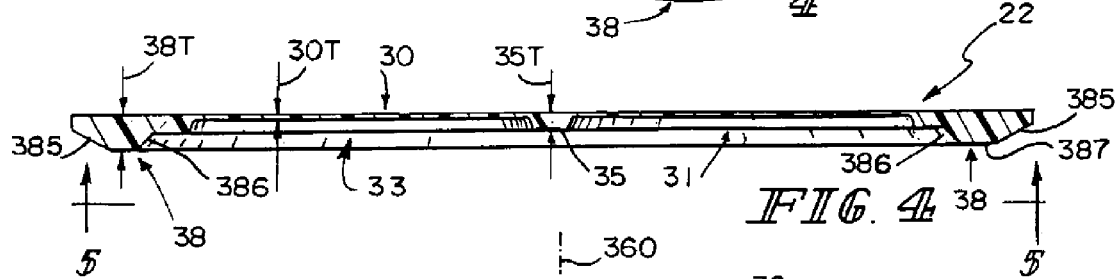
FIG. 4 is an enlarged sectional view of the liner taken along line 4-4 of FIG. 3.

As suggested in FIG. 4, once seal liner 22 is molded, annular seal rim 38 has a thickness 38T that is greater than a thickness 30T of membrane 30. Central leg connector 35 forms a protuberance having a thickness 35T that is greater than thickness 30T but less than thickness 38T. As an example, cross-shaped raised ridge 36 has the thickness 35T and is uniform throughout cross-shaped raised ridge 36 as suggested in FIGS. 3-5.

Figure 9:
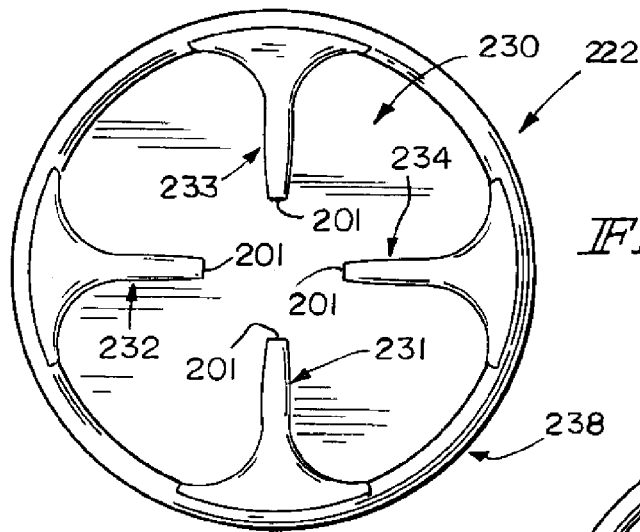
FIGS. 9-12 show views of four alternative compression-molded liners suitable for use in the cap illustrated in FIGS. 1 and 2.

Other compression-molded liner designs can also be used with cap 20, as shown in the embodiments of FIGS. 9-12. Compression-molded liner 222 includes a thin round membrane 230 and an annular seal rim 238 that is appended to a perimeter edge of membrane 230, as shown in FIG. 9. Compression-molded liner 222 also includes four ridge legs 231, 232, 233, 234 that are coupled to an underside of membrane 230 and to annular seal rim 238. In this embodiment, each of ridge legs 231, 232, 233, 234 includes a bell-shaped bell and a somewhat straight lead pipe that terminates at a free end 201. This liner configuration does not include a central protuberance such as leg connector 35 shown in FIG. 5.

Compression-molded seal liner 222 includes four ridge legs 231, 232, 233, 234 and each pair of adjacent ridge legs cooperates to form an included angle of about 90° therebetween as suggested in FIG. 9. Each of the inner sections terminates at a point located in spaced-apart relation to the center point of the mold face.

Figure 10:
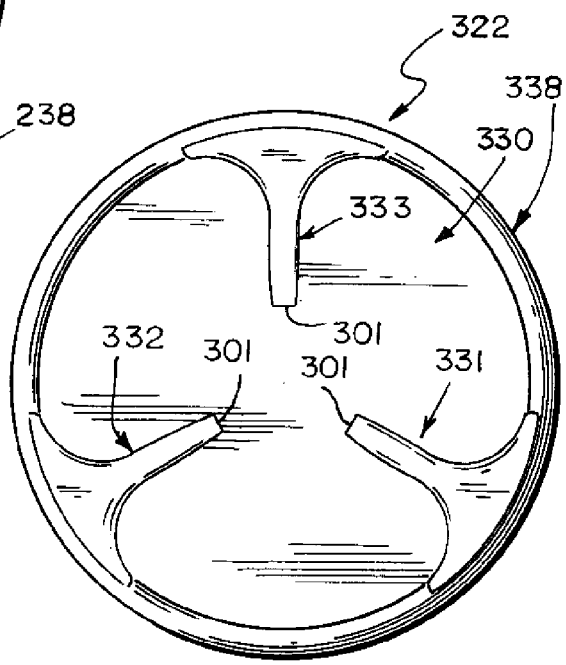

Compression-molded liner 322 includes membrane 330 and an annular seal rim 338 appended to a perimeter edge of membrane 330, as shown in FIG. 10. Compression-molded liner 322, in this embodiment, includes three ridge legs 331, 332, 333 that are coupled to the underside of membrane 330 and to annular seal rim 338. Ridge legs 331, 332, 333 are located at the four, eight, and twelve o'clock positions. In this embodiment, each of ridge legs 331, 332, 333 includes a bell-shaped bell and a somewhat straight lead pipe that terminates at a free end 301. This liner configuration does not include any central protuberance such as leg connector 35 shown in FIG. 5. Compression-molded seal liner 322 includes three ridge legs 331, 332, 333 and each pair of adjacent ridge legs cooperates to form an included angle of about 120° therebetween as suggested in FIG. 10.

Figure 11:
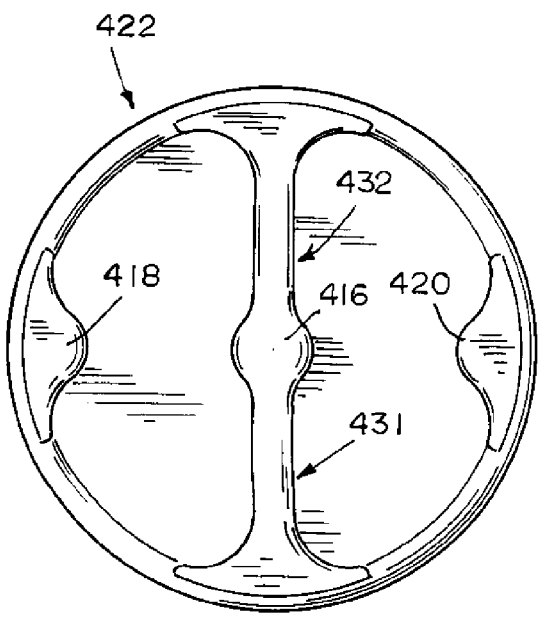

Compression-molded liner 422 includes membrane 430 and an annular seal 438 appended to a perimeter edge of membrane 430, as shown in FIG. 11. Compression-molded liner 422, in this embodiment, includes two ridge legs 431, 432 that are coupled to an underside of membrane 430 and to annular seal rim 438. Ridge legs 431, 432 are located at the six and twelve o'clock positions. In this embodiment, each of ridge legs 431, 432 includes a bell-shaped bell and a lead pipe that extend between the bell and a central protuberance such as leg connector 416. Compression-molded liner 422 also includes two bulging crowns 418, 420 that are coupled to annular seal rim 438 at three o'clock and nine o'clock positions and arranged to lie in spaced-apart relation to one another to locate leg connector 35 therebetween.

Figure 12:
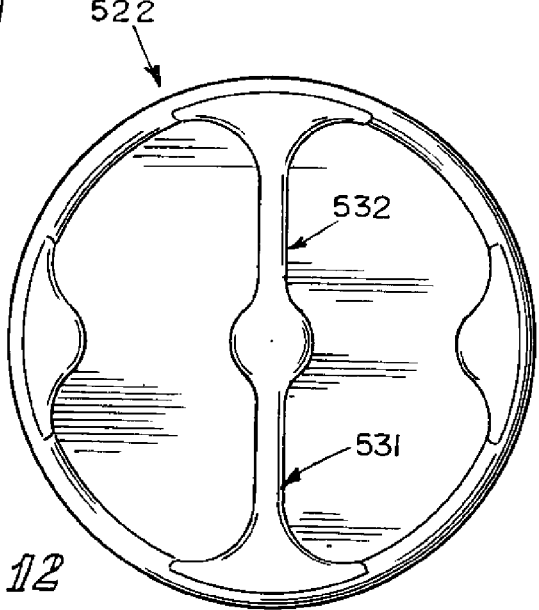

As suggested in FIGS. 11 and 12, a mold face in accordance with another embodiment of the present disclosure is formed to include two ridge-leg channels and each pair of adjacent ridge-leg channels cooperates to form an included angle of about 180° therebetween to cause compression-molded seal liner 422 to have two ridge legs 431, 432 that cooperate to form an included angle of about 180° therebetween and to cause compression-molded seal liner 522 to have two narrower ridge legs 531, 532 that cooperate to form an included angle of about 180° therebetween.

To produce closure 10, cap 20 is compression molded in a standard compression molded process. Alternatively, cap 20 can be manufactured by injection molding. Once cap 20 is formed, cap 20 is positioned on conveyor 58 with interior region 28 facing upwardly, as shown in FIG. 6a. With cap 20 on conveyor 58, dispenser controller 63 causes gob dispenser 62 to deposit a gob 64 of plastics material into interior region 28 of cap 20.

With gob 64 in position, cap 20 is then conveyed on conveyor 58 beneath liner-forming die 66, as shown in FIG. 6b. Once cap 20 is positioned beneath liner-forming die 66, die mover 65 causes liner-forming die 66 to move downwardly to engage gob 64, as shown in FIG. 6c. Downward movement of liner-forming die 66 causes gob 64 to flow across one-piece mold face 68 of liner-forming die 66 into annular seal rim-forming trench 72, as shown in FIGS. 7b-7e. Gob 64 flows through channels 81, 82, 83, 84 to allow for the complete filling of annular seal rim-forming trench 72 to form seal liner 22 on interior deck 21 of cap 20 to produce closure 10.

The invention claimed is:

1. A process of forming a closure adapted to be coupled to a filler neck of a container to close a mouth opening into a passageway formed in the filler neck and to establish a sealed connection between the closure and the filler neck, the process comprising the steps of
providing a cap formed to include an interior region,
depositing a gob of plastics material onto an interior deck of the cap to locate the gob of plastics material in the interior region of the cap, and
moving a liner-forming die having a one-piece mold face into the interior region of the cap to cause the one-piece mold face to engage and compress the gob of plastics material to cause plastics material in the gob to flow in a mold chamber defined between the liner-forming die and the interior deck of the cap to form a compression-molded seal liner on the interior deck of the cap in the interior region of the cap, wherein
the compression-molded seal liner includes a membrane and an annular sealing rim surrounding the membrane and mating with a perimeter portion of the membrane and
the one-piece mold face is formed to include a membrane-forming surface, an annular sealing rim-forming trench surrounding the membrane-forming surface, and channel means arranged to interrupt the membrane-forming surface for receiving a portion of the plastics material in the gob and conducting the portion in radially outward directions toward the annular sealing rim-forming trench of the one-piece mold face and a perimeter edge of the interior deck during movement of the one-piece mold face toward the interior deck to cause the membrane-forming surface to be covered completely with plastics material and to cause plastics material to flow into the annular sealing rim-forming trench to form the annular sealing rim therein.

2. The process of claim 1, wherein the compression-molded seal liner further includes a cross-shaped raised ridge coupled to the membrane and surrounded by the annular sealing rim.

3. The process of claim 2, wherein the cross-shaped raised ridge is formed from plastics material extant in the channel means during movement of the mold face of the liner-forming die toward the interior deck of the cap.

4. The process of claim 1, wherein the channel means includes a first ridge-leg channel communicating at an outlet end thereof with the annular seal rim-forming trench and providing a first fill path for plastics material extending toward the annular seal rim-forming trench.

5. The process of claim 4, wherein the channel means further includes a second ridge-leg channel communicating at an end thereof with the annular seal rim-forming trench and providing a second fill path for plastics material extending toward the annular seal rim-forming trench.

6. The process of claim 5, wherein the membrane-forming surface is round and has a circular perimeter edge bordering the annular seal rim-forming trench and a diameter extending between two points on the circular perimeter edge and the first and second ridge-leg channels are aligned with one another to extend in opposite directions along the diameter of the circular perimeter edge of the membrane-forming surface.

7. The process of claim 6, wherein each of the first and second ridge-leg channels includes an inlet end arranged to lie in spaced-apart relation to the annular seal rim-forming trench, the channel means further includes a leg-connector basin arranged to lie between and in fluid communication with the inlet end of each of the first and second ridge-leg channels, and the gob of plastics material at least in part is moved into the leg-connector basin during the moving step.

8. The process of claim 5, wherein the channel means further includes a third ridge-leg channel communicating at an outlet end thereof with the annular seal rim-forming trench and providing a third fill path for plastics material extending toward the annular seal rim-forming trench and each of the first, second, and third ridge-leg channels is arranged to extend from the annular seal rim-forming trench in a radially inwardly extending direction toward a center point located in the center of the membrane-forming surface.

9. The process of claim 8, wherein the channel means further includes a leg-connector basin arranged to lie at the center point in fluid communication with an inlet end of each of the first, second, and third ridge-leg channels and the gob of plastics material is moved at least in part into the leg-connector basin during the moving step.

10. The process of claim 5, wherein the channel means further includes a third ridge-leg channel communicating at an outlet end thereof with the annular seal rim-forming trench and providing a third fill path for plastics material extending toward the annular seal rim-forming trench and a fourth ridge-leg channel communicating at an outlet end thereof with the annular seal rim-forming trench and providing a fourth fill path for plastics material extending toward the annular seal rim-forming trench and wherein the membrane-forming surface includes a first raised pad bounded by the first and second ridge-leg channels and a first curved portion of the annular seal rim-forming trench, a second raised pad bounded by the second and third ridge-leg channels and a second curved portion of the annular seal rim-forming trench, a third raised pad bounded by the third and fourth ridge-leg channels and a third curved portion of the annular seal rim-forming trench, and a fourth raised pad bounded by the fourth and first ridge-leg channels and a fourth curved portion of the annular seal rim-forming trench.

11. The process of claim 10, wherein each of the first, second, third, and fourth raised pads has a teardrop-shaped perimeter edge.

12. The process of claim 10, wherein each of the first, second, third, and fourth raised pads includes a flat surface arranged to engage plastics material in the gob located outside of the first, second, third, and fourth ridge-leg channels during movement of the mold face of the liner-forming die toward the interior deck of the cap and the flat surfaces are arranged to lie in substantially coplanar relation to one another.

13. The process of claim 12, wherein each of the flat surfaces has a teardrop-shaped perimeter edge.

14. The process of claim 1, wherein the channel means includes a ridge-leg channel including an inner section located between the annular seal-rim forming trench and a center point located in the center of the membrane-forming surface and an outer section arranged to lie between and in fluid communication with the inner section and the annular seal rim-forming trench and the outer section is bell-shaped and has a width that widens progressively in a direction extending from the inner section toward the annular seal rim-forming trench.

15. The process of claim 14, wherein the membrane-forming surface includes a first raised pad and a second raised pad arranged to lie in spaced-apart relation to the first raised pad to locate the inner and outer sections of the ridge-leg channel therebetween.

16. The process of claim 15, wherein the first raised pad includes a curved convex exterior perimeter edge bordering one side of the bell-shaped outer section of the ridge-leg channel and having a radius of curvature of about 0.3 inches, the second raised pad includes a curved convex exterior perimeter edge bordering an opposite side of the bell-shaped outer section of the ridge-leg channel and having a radius of curvature of about 0.3 inches, and the curved convex exterior perimeter edges of the first and second raised pads cooperate to form flow-expansion means for expanding flow of plastics material flowing from the inner section into the annular seal rim-forming trench through the belt-shaped outer section to transfer plastics material in the gob into the annular seal rim-forming trench during the moving step.

17. The process of claim 15, wherein the inner section of the ridge-leg channel is defined between an exterior perimeter edge of the first raised pad and a confronting exterior perimeter edge of the second raised pad arranged to lie in substantially spaced-apart parallel relation to the exterior perimeter edge of the first raised pad to provide the inner section of the ridge-leg channel with a substantially uniform width.

18. The process of claim 17, wherein the first raised pad includes a curved convex exterior perimeter edge bordering one side of the bell-shaped outer section of the ridge-leg channel and having a radius of curvature of about 0.3 inches, the second raised pad includes a curved convex exterior perimeter edge bordering an opposite side of the bell-shaped outer section of the ridge-leg channel and having a radius of curvature of about 0.3 inches, and the curved convex exterior perimeter edges of the first and second raised pads cooperate to form flow-expansion means for expanding flow of plastics material flowing from the inner section into the annular seal rim-forming trench through the belt-shaped outer section to transfer plastics material in the gob into the annular seal rim-forming trench during the moving step.

19. The process of claim 14, wherein the channel means further includes a basin arranged to lie at the center point, the inner section is arranged to lie in fluid communication with the basin, the gob of plastics material is moved at least in part into the basin during the moving step, and plastics material in the gob moves through the inner and outer sections of the ridge-leg channel along a fill path into the annular seal rim-forming trench during the moving step.

20. The process of claim 1, wherein the mold chamber has a constant volume during engagement of the interior deck of the cap by the one-piece mold face.

21. The process of claim 1, wherein the one-piece mold face is also formed to include a basin and a ridge-leg channel, the ridge-leg channel includes an inner section located between the annular seal rim-forming trench and the basin and an outer section arranged to lie between and in fluid communication with the inner section and the annular seal rim-forming trench, the gob of plastics material is deposited at least in part into the basin during the depositing step, and the plastics material in the gob moves through the inner and outer section of the ridge-leg channel away from the basin in a radially outward direction toward and into the annular seal rim-forming trench during the moving step.

22. The process of claim 21, wherein the one-piece mold face is formed to include four ridge-leg channels and each pair of adjacent ridge-leg channels cooperates to form an included angle of about 90° therebetween to cause the compression-molded seal liner to have four ridge legs and to cause each pair of adjacent ridge legs to cooperate to form an included angle of about 90° therebetween.

23. The process of claim 21, wherein the one-piece mold face is formed to include two ridge-leg channels and each pair of adjacent ridge-leg channels cooperates to form an included angle of about 180° therebetween to cause the compression-molded seal liner to have two ridge legs that cooperate to form an included angle of about 180° therebetween.

* * * * *